United States Patent
Patel et al.

(10) Patent No.: US 9,541,106 B1
(45) Date of Patent: Jan. 10, 2017

(54) PLASMA OPTIMIZED AEROSTRUCTURES FOR EFFICIENT FLOW CONTROL

(75) Inventors: Mehul Patel, Chandler, AZ (US); Thomas Corke, Granger, IN (US); Alan B. Cain, Chesterfield, MO (US)

(73) Assignees: Orbitel Research Inc., Cleveland, OH (US); The University of Notre Dame du Lac, Notre Dame, IN (US)

( * ) Notice: Subject to any disclaimer, the term of this patent is extended or adjusted under 35 U.S.C. 154(b) by 3115 days.

(21) Appl. No.: 11/710,750

(22) Filed: Feb. 26, 2007

Related U.S. Application Data

(60) Provisional application No. 60/878,358, filed on Jan. 3, 2007.

(51) Int. Cl.
| | |
|---|---|
| *B64C 29/00* | (2006.01) |
| *F15D 1/00* | (2006.01) |
| *B64C 21/00* | (2006.01) |

(52) U.S. Cl.
CPC .............. *F15D 1/0065* (2013.01); *B64C 21/00* (2013.01)

(58) Field of Classification Search
USPC .................. 244/198, 199.1, 200, 200.1, 201, 204,244/204.1, 205
See application file for complete search history.

(56) References Cited

U.S. PATENT DOCUMENTS

| | | | |
|---|---|---|---|
| 2,514,695 A | 7/1950 | Dempsey | |
| 3,934,922 A | 1/1976 | MacCready, Jr. et al. | |
| 3,999,797 A | 12/1976 | Kirsch et al. | |
| 4,027,836 A | 6/1977 | Seibel | |
| 4,320,920 A | 3/1982 | Goudey | |
| 4,457,550 A | 7/1984 | Gielow et al. | |
| 4,688,841 A | 8/1987 | Moore | |
| 5,320,309 A * | 6/1994 | Nosenchuck et al. | 244/205 |
| 5,335,885 A * | 8/1994 | Bohning | 244/204 |
| 5,345,145 A | 9/1994 | Harafuji et al. | |
| 5,522,637 A | 6/1996 | Spears | |
| 5,588,804 A * | 12/1996 | Neely et al. | 416/223 R |
| 5,669,583 A | 9/1997 | Roth | |
| 6,267,331 B1 * | 7/2001 | Wygnanski et al. | 244/204 |
| 6,416,633 B1 | 7/2002 | Spence | |

(Continued)

FOREIGN PATENT DOCUMENTS

| | | |
|---|---|---|
| GB | 2 186 532 A | 8/1987 |
| WO | 2004/039671 A1 | 5/2004 |

OTHER PUBLICATIONS

"Fundamentals of Aerodynamics", John D. Anderson, Jr.; Third edition, 2001.*

(Continued)

*Primary Examiner* — Philip J Bonzell
(74) *Attorney, Agent, or Firm* — Brian Kolkowski

(57) ABSTRACT

The present invention relates to a method of designing or optimizing a control surface for use with plasma actuators for controlling an aircraft, missile, munition or automobile, and more particularly to controlling fluid flow across their surfaces or other surfaces using plasma actuators, which would benefit from such a method. The various embodiments provide the steps to increase the efficiency of aircraft, missiles, munitions and automobiles. The method of flow control also provides a means for reducing aircraft, missile's, munition's and automobile's power requirements. These methods also provide alternate means for aerodynamic control using low-power hingeless plasma actuator devices.

20 Claims, 9 Drawing Sheets

(56) References Cited

U.S. PATENT DOCUMENTS

| | | | |
|---|---|---|---|
| 6,457,654 B1* | 10/2002 | Glezer et al. | 239/4 |
| 6,527,221 B1 | 3/2003 | Kremeyer | |
| 6,570,333 B1 | 5/2003 | Miller et al. | |
| 6,619,587 B1 | 9/2003 | Chow et al. | |
| 6,644,598 B2* | 11/2003 | Glezer et al. | 244/208 |
| 6,796,532 B2 | 9/2004 | Malmuth et al. | |
| 6,805,325 B1* | 10/2004 | Malmuth et al. | 244/205 |
| 6,854,788 B1 | 2/2005 | Graham | |
| 7,070,144 B1* | 7/2006 | DiCocco et al. | 244/3.21 |
| 7,121,511 B2 | 10/2006 | Kremeyer | |
| 7,380,756 B1* | 6/2008 | Enloe et al. | 244/175 |
| 7,404,592 B2 | 7/2008 | Reiman et al. | |
| 7,588,413 B2* | 9/2009 | Lee et al. | 415/115 |
| 7,624,941 B1 | 12/2009 | Patel et al. | |
| 2002/0190165 A1* | 12/2002 | Glezer et al. | 244/207 |
| 2003/0102406 A1 | 6/2003 | Chow et al. | |
| 2004/0011917 A1 | 1/2004 | Saeks et al. | |
| 2004/0104358 A1 | 6/2004 | Moroz | |
| 2004/0195462 A1 | 10/2004 | Malmuth et al. | |
| 2004/0195463 A1* | 10/2004 | Scott et al. | 244/205 |
| 2004/0200932 A1* | 10/2004 | Scott et al. | 244/206 |
| 2005/0118350 A1 | 6/2005 | Koulik et al. | |
| 2005/0255255 A1 | 11/2005 | Kawamura et al. | |
| 2006/0102775 A1 | 5/2006 | Chow et al. | |
| 2007/0040726 A1 | 2/2007 | Kremeyer | |
| 2007/0095987 A1* | 5/2007 | Glezer et al. | 244/200.1 |
| 2007/0108344 A1 | 5/2007 | Wood | |
| 2007/0176046 A1 | 8/2007 | Kremeyer | |
| 2007/0257513 A1 | 11/2007 | Schwartz | |
| 2008/0067283 A1 | 3/2008 | Thomas | |
| 2008/0116715 A1 | 5/2008 | Steel | |
| 2008/0122252 A1 | 5/2008 | Corke et al. | |

OTHER PUBLICATIONS

International Search Report in connection with International Application No. PCT/US07/63993, Mailed May 21, 2008, 2 pages.
Written Opinion of the International Searching Authority in connection with International Application No. PCT/US07/63993, Mailed May 21, 2008, 6 pages.
Written Opinion of the International Searching Authority in reference to PCT Application No. PCT/US07/83488 mailed May 9, 2008, 5 pages.
International Search Report in reference to PCT Application No. PCT/US07/83488 mailed May 9, 2008, 2 pages.
International Preliminary Report on Patentability, corresponding to International Application No. PCT/US2007/083488, mailed May 14, 2009, issued May 5, 2009, 6 pages.
USPTO OA mailed Jan. 14, 2008 in connection with U.S. Appl. No. 11/686,153.
USPTO OA mailed Aug. 11, 2008 in connection with U.S. Appl. No. 11/686,153.
USPTO OA mailed Apr. 27, 2009 in connection with U.S. Appl. No. 11/686,153.
USPTO OA mailed Dec. 10, 2009 in connection with U.S. Appl. No. 11/686,153.
USPTO OA mailed Jul. 20, 2010 in connection with U.S. Appl. No. 11/686,153.
USPTO OA mailed Feb. 26, 2009 in connection with U.S. Appl. No. 11/934,272.
USPTO OA mailed Jun. 23, 2009 in connection with U.S. Appl. No. 11/934,272.
USPTO OA mailed Jan. 11, 2010 in connection with U.S. Appl. No. 11/934,272.
USPTO OA mailed May 17, 2010 in connection with U.S. Appl. No. 11/934,272.
USPTO OA mailed Sep. 2, 2010 in connection with U.S. Appl. No. 11/934,272.
USPTO OA mailed Mar. 3, 2011 in connection with U.S. Appl. No. 11/934,272.
U. Michel, et al; "Flyover Noise Measurements on Landing Aircraft with a Microphone Array", 1998, American Institute of Aeronautics and Astronautics, Inc. 7 pages.
Christopher S. Allen, et al; "Effect of Freestream Turbulence on the Flow-Induced Background Noise of In-Flow Microphones" American Institute of Aeronautics and Astronautics, Inc., in $4^{th}$ AIAA/CEAS Aeroacoustics Conference, 1998, 11 pages.
F. Li, et al; "Unsteady Simulation of a Landing-Gear Flow Field", American Institute of Aeronautics and Astronautics, Inc. $8^{th}$ AIAA/CEAS Aeroacoustics Conference, Jun. 17-19, 2002, 13 pages.
C.L. Enloe, et al; "Mechanisms and Responses of a Single Dielectric Barrier Plasma Actuator: Geometric Effects", AIAA Journal, vol. 42, No. 3, Mar. 2004, pp. 595-604.
Christopher S. Allen, et al; "Current Background Noise Sources and Levels in the NASA Ames 40-by 80-Foot Wind Tunnel—A Status Report", NASA Ames Research Center, Moffett Field, California, 3 pages, Nov. 2003.
Junhui Huang, et al; "Plasma Actuators for Separation Control of Low-Pressure Turbine Blades", AIAA Journal, vol. 44, No. 1, Jan. 2006, pages.
Junhui Huang, et al; "Unsteady Plasma Actuators for Separation Control of Low-Pressure Turbine Blades", AIAA Journal, vol. 44, No. 7, Jul. 2006, pp. 1477-1487.
Vadim Stepaniuk, et al; "Sound Attenuation by Glow Discharge Plasma", AIAA Journal, vol. 42, No. 3, Mar. 2004, pp. 545-550.
Martiqua L. Post, et al; "Separation Control on High Angle of Attack Airfoil Using Plasma Actuators", AIAA Journal vol. 42, No. 11, Nov. 2004, pp. 2177-2184.
Susan Olson; "Slat Tonal Noise Mechanisms in a Two-Dimensional Multi-Element Airfoil Configuration", Ph.D. Dissertation Submitted to the Graduate School of the University of Notre Dame, 7 pages, Apr. 2003.
K. Hannemann, et al; "Numerical simulation of the absolutely and convectively unstable wake", J. Fluid Mech. 1989, vol. 199, pp. 55-88.
D.A.Hammond,et al; "Global dynamics of symmetric and asymmetric wakes", J. Fluid Mech. 1997, vol. 331, pp. 231-260.
Martiqua L. Post; "Phased Plasma Actuators for Unsteady Flow Control", A Thesis M.S. Thesis University of Notre Dame Department of Aerospace and Mechanical Engineering, Jul. 2001, 7 pages.
C.L. Enloe, et al; Mechanisms and Responses of a Single Dielectric Barrier Plasma Actuator: Plasma Morphology, AIAA Journal, vol. 42, No. 3, Mar. 2004, pp. 589-594.
Alexander Fridman, et al; "Plasma Physics and Engineering", Taylor & Francis, New York, pp. 573-579, 2004.
J.E. Ffowcs Williams, et al; "Sound Generation by Turbulence and Surfaces in Arbitrary Motion", Philosophical Transactions for the Royal Society of London, Series A, Mathematical and Physical Sciences, vol. 264, Issue 1151, pp. 321-342, May 8, 1969.
David P. Lockard, et al; "AIAA 2004-2887 Aeroacoustic Analysis of a Simplified Landing Gear", $10^{th}$ AIAA/CEAS Aeroacoustics Conference May 10-13, 2004, Manchester, UK, pp. 1-11.
Barry Lazos; "Surface Topology on the Wheels of a Generic Four-Wheel Landing Gear", AIAA Journal, vol. 40, No. 12, Dec. 2002, pp. 2402-2411.

* cited by examiner

PLASMA OPTIMIZED AEROSTRUCTURES FOR EFFICIENT FLOW CONTROL

CROSS-REFERENCE TO RELATED APPLICATIONS

This application is a non-provisional application that claims priority to the U.S. provisional patent application having Ser. No. 60/878,358, which was filed on Jan. 3, 2007.

The U.S. Government has a paid-up license in this invention and the right in limited circumstances to require the patent owner to license others on reasonable terms provided for by the terms of grants FA8651-05-C-0105 awarded by the U.S. Air Force, AFRL, Munitions Directorate, Eglin Air Force Base.

BACKGROUND OF THE INVENTION

1. Field of the Invention

The present invention relates to a method of controlling aircraft, missile, munition or automobiles with plasma actuators, and more particularly to controlling fluid flow across their surfaces, or other surfaces that would benefit from such a method. The present invention is also a method of designing an aerodynamic surface by introducing geometric features which when used in conjunction with a plasma actuator improve the performance of the surface and enable the use of a plasma actuator for aerodynamic and flight control.

2. Technical Background

Traditionally aircraft, missiles, munitions or automobiles use some type of control surfaces to control aerodynamic stability and/or maneuverability during operation. For example, high-lift systems play an important role in the design of aircraft. The wings on most modern-day aircraft are equipped with high-lift systems that are generally in the form of moveable leading-edge slats and trailing-edge flaps. These devices have been shown to enhance the aerodynamic performance of air vehicles through improvements in the coefficient of lift, lift to drag ratio, and stall-angle. Advantages of such "performance-enhancing" devices include improvements in maneuverability, turn rates, glide range and payload, and reductions in takeoff/landing distances and field length requirements. Other traditional control surfaces in the aerospace application include ailerons, rudders, elevators and elerons. Similarly, examples of traditional control surfaces for missiles/munitions include canards, fins and other body extensions, and for automobiles, front and rear spoilers, inlets, and other body extensions.

While the benefits of these conventional control surfaces are well documented, it is also known that the use of moveable control surfaces increase airframe noise and vibration, particularly at high deflection angles. With these types of surfaces, most of the noise originates from the separated flow in the gap or hinge regions, which contribute to the drag component of the viscous or pressure drag on the control surface. At off-design conditions, the drag penalty from these traditional control surfaces is very high. For example, by some estimates used in wing and tail design, eliminating the hinge gaps would result in a 10% drag decrease. In addition, for military applications, the hinge gap is a source of radar wave reflection resulting in a more detectable radar image. Another significant drawback with traditional moving control surfaces is that motors or pneumatics are required for their operation, which adds volume, weight, and cost to aircraft using these types of systems.

In a relentless pursuit to reduce aerodynamic drag, aircraft designers are continuously researching technologies that aim to optimize airfoil shapes to obtain the lowest possible drag during cruise. In 1970s, NASA developed the Natural Laminar Flow (NLF) airfoil series based on computer optimization techniques which improved lift-to-drag (L/D) ratio of airfoils by maintaining laminar flow up to 50% chord. A general feature of NLF airfoils is that the surface pressures remain nearly constant over a significant portion of the airfoil surface, and the profile of the aft pressure recovery region generally attempts to assume a shape that keeps the boundary layer on the verge of separation (zero-wall-shear). Also, in the late 60s and early 70s, the USAF developed a program called "Controlled Configured Vehicles" (CCV) that focused on integrating aerodynamic control surfaces, flow sensors, and automatic control for flight performance and control improvements. This program was successful in showing how this technology could be used to control wing loading during encounters with turbulence, expanding the flutter boundaries, reducing wing weight, and benefits of reduced static stability. This program played a significant role in the designs of present USAF aircraft. The proposed program seeks to achieve similar revolutionary changes in the design of future aircraft surfaces by incorporating advanced flow control technology with conventional and morphing wings.

Adaptive surfaces have been employed on aircraft for effectively changing the leading- and trailing-edge cambers in flight. This has been shown to eliminate sudden pressure jumps due to discontinuous surfaces such as slats and flaps on the wing. Recently, it was shown that the variable camber trailing edge can prevent roll reversal from occurring at flight speeds where the traditional ailerons are no longer effective. While morphing technology has shown the potential to greatly increase the capability of aerodynamic systems. Adapting the wing shape in flight by changing its camber, span, area, sweep angle or twist, would enable an aircraft to radically expanding its flight envelope.

The USAF-Mission Adaptive Wing program demonstrated the advantages of the morphing camber concept. However, one of the major challenges faced by researchers designing a morphing vehicle is the integration of the morphing mechanism into the wing structure along with the use of efficient actuation devices. It is desired to enhance the extent of flow control over an adaptive wing while relaxing some of the power and magnitude requirements for wing articulation.

In view of the foregoing disadvantages of the presently available and conventional moving control surfaces, it is desirable to formalize a method for optimally shaping flow control surfaces for missiles, aircraft, munitions and automobiles, for use with flow control actuators without compromising baseline aerodynamic performance. In addition, it intends to formalize a method for optimally placing flow control actuators, especially plasma actuators on such shapes to maximize a metric of merit such as lift control or reduced drag.

SUMMARY OF THE INVENTION

The present invention relates to a method of controlling aircraft, missile, munition or automobiles with plasma actuators, and more particularly to controlling fluid flow across their surfaces or other surfaces, which would benefit from such a method. The present invention is also a method of designing an aerodynamic surface by introducing geometric features which when used in conjunction with a plasma actuator improve the performance of the surface and enable the use of a plasma actuator for aerodynamic and flight control.

The various embodiments of the method of the present invention provide the steps to increase the efficiency of aircraft, missiles, munitions and automobiles. The method of flow control provides a means for reducing an aircraft's, missile's, munition's and automobile's power requirements. These methods provide alternate means for aerodynamic control using low-power hingeless plasma actuator devices.

A plasma actuator—fluid flow control device—is an unconventional device/actuator used as an actuator in the present invention. The plasma actuator has no moving parts. Plasma actuators when used on a conventional control surface such as a wing on an aircraft are highly effective in improving lift and reducing drag by way of controlling/reducing flow separation. Advantages of using a plasma actuator for aerodynamic control include: low observability, reduced weight and power of the control system, and low parasitic drag of the vehicle, which translates into high endurance and range. Plasma actuators, much like any other flow control devices, do not work at their optimal settings, and therefore do not render the maximum benefits, if the surfaces (wings, fins, etc.) to which they are attached to are not designed with the actuator in mind from the beginning. The use of plasma actuators in conjunction with a control-configured surface of the present invention offers the potential to create new and unique classes of aircraft with improved aerodynamic performance. Plasma actuator(s) located at the wing trailing-edge can provide changes in lift comparable to those produced by a movable flap on an aircraft. Also, when used in an unsteady operation, the plasma actuator power is reduced by 90% compared to the steady operation. This creates an opportunity to exploit the benefits of low-power actuation for achieving control at all angles of attack by modifying the airfoil design such that it renders flow conditions suitable for the "unsteady" actuator operation.

One method of the present invention involves the use of an optimum-configured design that provides a controllable separation bubble at the trailing edge that can be manipulated by a plasma actuator to control lift and lift moment. This method seeks a balance between the extent of the laminar flow region and the separated flow region to exploit the laminar effects, as well as the controllable separated flow for lift control.

The shapes generated by the method of the present invention generally yield a separated flow field in the aft pressure recovery region that can be manipulated using flow control, which produces an effect like added camber or a moveable plane flap to alter the lift coefficient and shift the lift coefficient at which the drag minimum occurs (so-called drag bucket). The use of plasma actuators for flight control without moving surfaces provides additional benefits. This particular method of the present invention provides a procedure to harmonize the effects of flow control with a control-configured airfoil shape to enable a compliant flow topology for control with no movable control surfaces. One method used to maximize these effects is to modify the contour of the flow control surface to actually design the surface to create flow disturbances. One specific embodiment would be to incorporate what is known as a Stratford ramp into the design of the flow-configured airfoil from the beginning. This will follow a design optimization approach where the metric of performance is on achieving a maximum lift-control between the surface modification and the plasma actuator(s). This method focuses on the design of an optimization process that systematically integrates the desired surface feature (Stratford ramp) into the basic airfoil shape to provide the benefit of an aft separation section for flight control. This concept involves the use of a plasma actuator for control; the concept, however, is applicable to other flow control actuators as well.

Another approach to flow control over a control surface is the use of morphing wings on the aerostructure. Aircraft having a fixed-wing structure are not ideal for every aspect of a flight plan. For example, the present approach to designing aircraft for efficient long range cruise is to select a section shape that has a drag minimum that encompasses the change in the design lift coefficient as fuel is consumed and the aircraft weight changes during the flight plan. This fixed profile offers no flexibility for multiple missions. For another example, while long range or long endurance aircraft require high wing loading with thick wings that provide a wide drag bucket, intercept and high altitude aircraft require low wing loading that can have a lower thickness-to-chord ratio. Variable profile geometry wings are needed to accommodate the needs of multi-mission aircraft. Mechanical configurable wings require added complexity and weight. Plasma actuators offer an advantage in this regard by providing the effects of variable geometry on fixed surfaces without significant added weight or power requirements. Plasma flow control technology in combination with a designed compliant surface of the present invention creates a new and unique class of aircraft that can achieve improved maneuverability and performance. These designs with optimal location and distribution of actuators and sensors with compliant behavior will provide: (a) intrinsically lower drag than conventional airfoils because of the laminar flow profile, and (b) a compliant flow field that can easily be controlled using a low-power plasma actuator.

This also provides wing designs that are optimized for such aspects as internal volume or strength-to-weight ratio rather than on aerodynamics. Also, the aerodynamic characteristics of the wing can be continually optimized during long range cruise or for large endurance by producing a virtual camber change that compensates for a changing design lift coefficient to always be centered in the drag bucket as fuel is expended during the mission.

The present invention is aimed at harmonizing plasma flow control with conforming wing shapes and feedback control to enable a compliant flow topology over a broad range of flight conditions. The concept is aimed at maximizing these effects by incorporating flow actuators into the design of the wing profile from the beginning. This will follow a design optimization approach where the metric of merit will be on achieving a maximum lift control derivative. Our approach is intended to bring a formalism to the flow-control design method. The work results in a design tool that is capable of generating an optimum arrangement of geometry, and actuator and sensor configurations to meet specified flight vehicle performance requirements. In addition to being a design tool, this approach also allows quantitative comparisons to be made between competing types of actuators or flight control approaches by considering the total system performance, including the actuator power budget.

In one embodiment of the present invention is an aircraft, missile, projectile, munition, surface craft, or automobile comprising at least one surface over which air flow occurs, the at least one surface further comprising a modified contour to the surface, the modified contour creating a surface flow disturbance along the surface, and at least one plasma actuator being positioned on the surface to affect the created flow disturbance along the surface when actuated, wherein the at least one plasma actuator when actuated modifies the air flow over the at least one surface. In this embodiment of the present invention, the aircraft, missile, projectile, munition, surface craft, or automobile has a surface wherein the surface is a control surface. The aircraft, missile, projectile, munition, surface craft, or automobile modification in the control surface that preferably a Stratford ramp. The plasma actuator, in this embodiment may operate in a steady or an unsteady state. The aircraft, missile, projectile, munition, surface craft, or automobile in various embodiments may activate its plasma actuator at a frequency equal to between about 0.6 to about 4 times the velocity of the fluid flowing over the surface divided by a characteristic placement distance, or the extent of flow separation. The operation of the plasma actuator modifies at least one aerodynamic condition of the surface.

Another embodiment of the present invention includes a method of designing an aircraft, missile, projectile, munition, surface craft, or automobile to enhance at least one aerodynamic condition of at least one surface comprising the step of: designing at least one modification having a location on at least one surface of an aircraft, missile, projectile, munition, surface craft, or automobile over which air flows, the modification having a geometry, and a placement of at least one plasma actuator further comprising the step of: changing the location of the modification of the geometry of the contour along the length of the at least one surface to optimize the location in combination with the placement of the plasma actuator to enhance at least one aerodynamic condition. The modification on at least one surface is preferably a Stratford ramp. The method of this embodiment further includes optimizing both the depth and the length of the ramp. The method of this embodiment further includes placement of a sensor for detecting changes in flow conditions on the surface about the actuator or modification of contour. Here, the modification of the contour of the surface and the placement of the plasma actuator optimize at least two aerodynamic conditions for a given application. The plasma actuator, in this embodiment is mounted flush with the surface, which is a control surface.

In another embodiment, the present invention includes a method of designing an aircraft, missile, projectile, munition, surface craft, or automobile to enhance at least one aerodynamic condition of at least one surface comprising the step of: designing at least one modification having a location on at least one surface of an aircraft, missile, projectile, munition, surface craft, or automobile over which air flows, the modification having a geometry, and a placement of at least one plasma actuator further comprising the step of: changing the length and the depth of the modification of the geometry of the contour of the at least one surface to optimize the depth of the modification of the geometry of the contour in combination with the placement of the plasma actuator to enhance at least one aerodynamic condition. The modification on at least one surface is preferably a ramp. The method of this embodiment includes optimizing the length and depth of the ramp. The method of this embodiment further includes placement of a sensor for detecting changes in flow conditions on the surface about the actuator or modification of contour. Here, the modification of the contour of the surface and the placement of the plasma actuator optimize at least two aerodynamic conditions for a given application. The plasma actuator is preferably mounted flush with the surface, which is a wing.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DESCRIPTION OF THE PREFERRED EMBODIMENT

Figure 1:
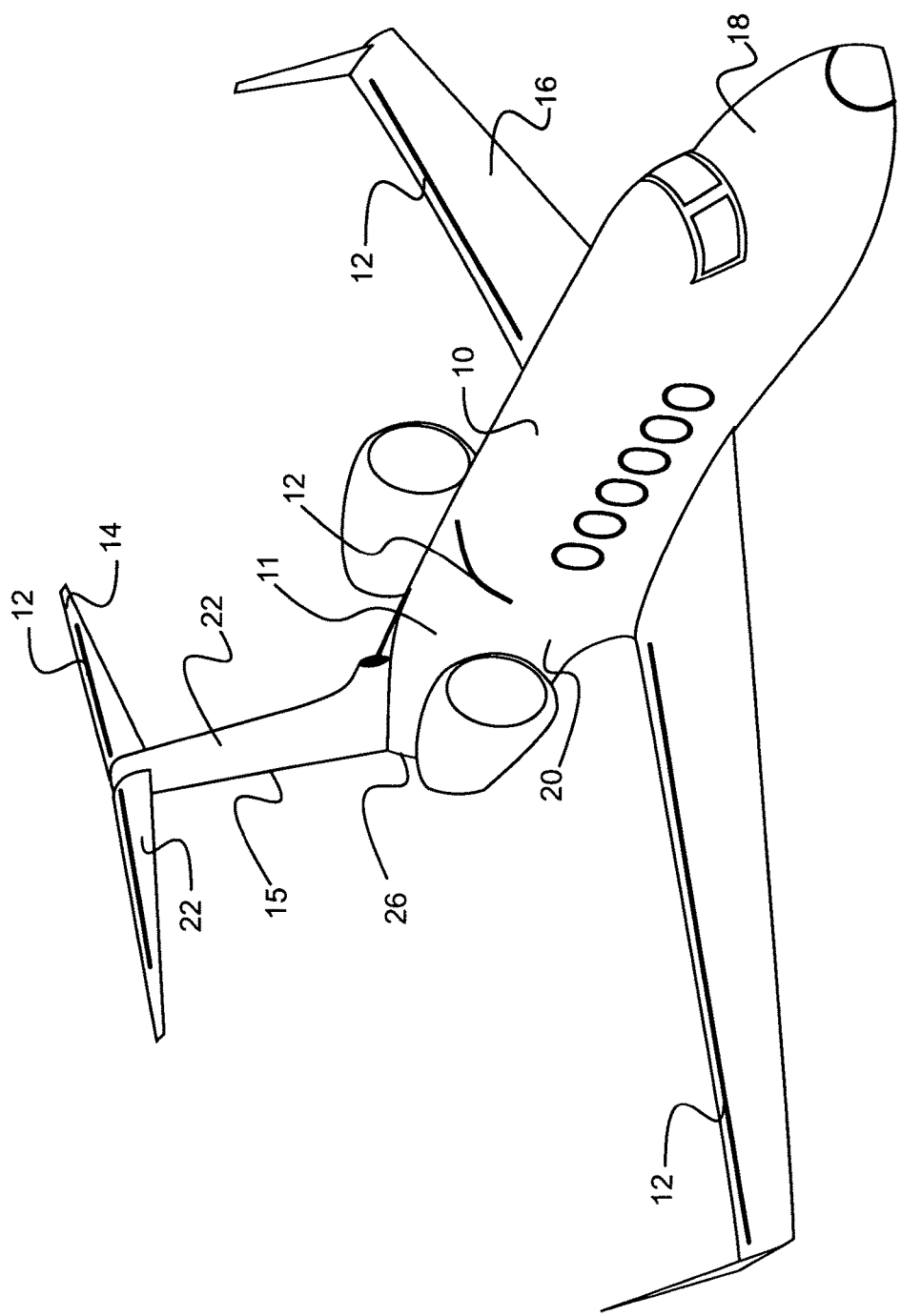
FIG. 1 is a schematic of an aircraft with plasma actuators attached to the trailing edge of its control surfaces.

The present invention relates to a method of controlling aircraft, missile, munition or automobiles with plasma actuators, and more particularly to controlling fluid flow across their surfaces or other surfaces, which would benefit from such a method. The present invention is also a method of designing an aerodynamic surface by introducing geometric features which when used in conjunction with a plasma actuator improve the performance of the surface and enable the use of a plasma actuator for aerodynamic and flight control. U.S. patent application Ser. No. 11/415,535 is herein incorporated by reference.

The method involves a number a number of steps. Depending on particular embodiments of the method, the method could include one or more of the following steps, but is not limited to only these steps. Possible steps are: locating or placing a plasma actuator; modifying the surface to better predict when and where flow separation is likely to occur on the surface, measuring or estimating the free stream velocity of fluid flowing past the surface on which the plasma actuator is located; modifying the surface to enhance the effect of a plasma actuator on the free-stream flow field for improved control; locating or placing a sensor at or near the plasma actuator; determining or estimating in real-time or from tests or models when and where flow separation is likely to occur on the surface; activating and deactivating the plasma actuator to obtain optimal performance.

In locating a plasma actuator, the plasma actuator, preferably, is a dielectric-barrier-discharge (DBD) plasma actuator. The DBD, or single dielectric barrier discharge (SDBD), or surface discharge plasma actuator preferably consists of two electrodes that are separated by a layer of dielectric material. One of the electrodes is preferably exposed to the surrounding air and the other fully encapsulated by the dielectric material during application. The electrodes are preferably made with good conductors such as copper, gold, silver and other forms of films, foils and plates. The dielectric material, preferably is made from material(s) exhibiting good dielectric properties, which can withstand the electric field gradient and the localized materials heating of the plasma actuator resulting from the process of ionizing the air or fluids surrounding an aircraft, missile, munition or automobile. Dielectric materials include but are not limited to fiberglass, Teflon, Kapton, and the like. More preferably the dielectric material used is Teflon or Kapton film, or derivations thereof.

Preferably, the plasma actuator is an off-centered laminate formed with one conductor electrode being joined to the upper surface of the dielectric material and the other conductor electrode being joined to the lower surface of the dielectric material. Still preferably, the electrodes are arranged in an asymmetric arrangement such that there is little or no overlap in order to ensure uniform plasma in the spanwise direction of the plasma actuator. The center of this overlap or junction of the plasma actuator (with no overlap) is the point at which the disturbance is produced to affect the flow, preferably at the location of separation point measured by a flow sensor. This point also marks a location from which the plasma actuator's placement distance is measured from the trailing edge or aft end of a control surface. Preferably, the overlap is less than about 2 cm, more preferably less than about 1 cm, and most preferably less than about 1 mm.

The plasma actuator can be located on any surface of a missile, aircraft, munition or automobile. Preferably, the plasma actuator is located on the surface where it can function for a given purpose or to increase performance. The plasma actuators can be used to eliminate/promote flow separation to affect lift, drag, and control pitch, roll, and yaw moments around the control surface depending on how they are placed and operated. The placement distance of the plasma actuator is measured from the center of the overlap or junction of the electrodes of the actuator to the trailing edge or aft end of the surface.

The plasma actuator can be attached to the surface or preferably mounted essentially flush to the surface. The plasma actuator can be produced by various laminating technologies or other techniques know to those skilled in the art. These technologies can be used to build the plasma actuator into the surface or for applying on an existing surface. The plasma actuator can be applied to the surface by adhesive attachment, bonding and the like. Plasma actuators, which are mounted flush are preferably mounted in a recess built into the surface to which it is applied. Preferably, the plasma actuator is flush or nearly flush with the surface to which it has been installed thereby creating a smooth surface with no boundary layer tripping or undue parasitic drag effects on the missile, aircraft, munition or automobile during operation.

The basic premise of designing a plasma-optimized structure is to either, a) control the aerodynamic forces on the surface with a pre-designed region of separated flow, or b) cause the flow to separate on the surface containing a section in which the wall shear stress is close to zero. This can be done by adopting a design optimization process that systematically integrates the desired feature such as a Stratford ramp into the original airfoil shape to provide the benefit of both a low-drag profile and a separation aft section for control.

The uniqueness in this approach is the resulting design of a unified flow control—configured shape which renders efficient control authority suited for both on and off-design flow conditions. The potential benefit would be utilization of distributed actuators with relatively small amount of actuation energy to affect the flow over the entire surface to bring about a virtual shape for aerodynamic control.

In modifying the control surface, the objective of the methods of the present invention is to better predict or control the onset and field of flow separation across the surface, or to enhance the control effectiveness of the plasma actuator on the free-stream flow. Preferably, the modification comprises a ramp that induces boundary layer separation in the flow. More preferably, the modification is a Stratford Ramp that is created in the control surface to induce continuous boundary layer separation and a flow detachment point at a specific location on the control surface. Stratford Ramp is a design, when observed from the side view, that usually features a highly concave shape with a backward facing smooth step or an arc. The ramp, in general sense, is used to induce flow separation over the control surface and provide a fixed known location of the point of flow separation. The general form of a ramp, when observed from the side view, may also just be a line, having no arc that is essentially a cut out of the control surface at some angle. The modification having a geometry, and a placement of at least one plasma actuator further comprises the step of: changing the location of the modification of the geometry of the contour along the length of the at least one surface to optimize the location in combination with the placement of the plasma actuator to enhance at least one aerodynamic condition. The method of this embodiment further includes optimizing the depth of the ramp. To determine the preferable combination of the length and depth of the surface modification such as for example by using a Stratford ramp, an optimization routine must be performed. The optimization routine may preferably be used to optimize at least one aerodynamic condition, but more preferably may be used to optimize at least two aerodynamic conditions.

The optimization of the present invention is an iterative design process. The process involves determining (using computational fluid dynamics (or "CFD")/wind tunnel tests) to determine how effective the modified airfoil design is using the two parameter search approach, that is length and depth of the ramp, by quantifying changes in the aerodynamic forces produced by the plasma actuator under certain design constraints. For example, the optimization can affect the lift and drag values, compare these values to the baseline or control (original, no plasma) design, and if the changes surpass a certain amount (user-defined), the iterative process is continued to further optimize the design using these parameters, or additional new parameters which may be revealed as more influential ones during the process. If the results are discouraging, a different parameter is varied, and the iterative process is continued. If the new design satisfies all the predetermined constraints (user-defined), the design is optimized for the given need and the surface modification such as a Stratford ramp then has the optimal dimensions that are necessary to optimize the effects of the plasma actuator. Advanced optimization routines can be employed to reduce time for optimization and improve efficiency once the key design parameters are identified.

Preferably, the modified control surface in combination with the plasma actuators when activated at the designed operating parameters exceeds or improves at least one performance criteria including but not limited to drag, lift, and the like of the control surface prior to modification under those same operating parameters. More preferably, the modified control surface in combination with the plasma actuators when activated at the designed operating parameters exceeds or improves at least one performance criteria including but not limited to drag, lift, power requirements and the like of a similar natural laminar flow surface under those same operating parameters. Even more preferably, the modified control surface in combination with the plasma actuators when activated at the designed operating parameters exceeds or improves at least two performance criteria including but not limited to drag, lift, power requirements and the like of the control surface prior to modification under those same operating parameters. Most preferably, the modified control surface in combination with the plasma actuators when activated at the designed operating parameters exceeds or improves at least three performance criteria including but not limited to drag, lift, power requirements and the like of the control surface prior to modification under those same operating parameters. Preferably, the modified control surface is designed such that the performance is still good in the absence of the plasma actuators.

In measuring or estimating the velocity of fluid flowing past the surface, any technique known to those skilled in the art can be used. The velocity of a fluid flowing over surface can be measured by a number of different types of sensors. These sensors include but are not limited to dynamic pressure sensors (fast-response sensors), pitot static tubes, laser Doppler anemometry, particle image velocimetry, a speedometer, and hot wire and hot film anemometry. These sensors generally give off an electronic signal that can be read or feed into a controller. In addition, the velocity can be estimated or calculated by a number of techniques known to those skilled in the art using indirect information from the aircraft, missile, munition or automobile such as for example engine speed, telemetry, and the like. Preferably, the velocity of the fluid is measured as close to the plasma actuator as possible to most accurately help in determining the actuation characteristics of the plasma actuator. More preferably, at least one sensor is used to measure velocity. Preferably, the sensor used is located within 24 cm from the plasma actuator, more preferably under 12 cm and most preferably under 2 cm.

The power source for the plasma actuators can be alternating or direct current (AC or DC). The plasma actuators in the specific embodiments within this application preferably use ±24 volts DC. The power required for these embodiments is generally 150% of the power applied to the actuator itself. Any type of power available can be converted to direct current and for these specific embodiments is preferably ±24 volts DC. The efficiency of commercial off-the-shelf converters can range from 80% to as high as 96%. These can be AC-to-DC type or DC-to-DC type converters depending on what source of power is being used. Ordinary household AC power for instance can be converted to ±24 volts DC. The same can be said for 12 volts DC which is available in most automobiles.

Power levels applied to an actuator are dependent on the application of the actuator and whether the actuator is being operated in the steady or unsteady mode. In the steady mode, the actuator is continuously on and in the unsteady mode the actuator is switched on and off at a particular modulation/pulsing frequency, which is set by taking the velocity in meters/second and dividing this by the placement distance in meters of the plasma actuator or by the extent of flow separation. Effective results in "steady operation" can be achieved using 40 watts per linear foot of actuator. This is assuming 100% duty cycle operation. If the actuator is cycled on and off, the on time can be as low as 10% of the total time whereas the off time is 90%. At a 10% duty cycle, the total power consumed by an actuator running 40 watts per linear foot is only 4 watts per linear foot. Effective results, thus, in the "unsteady operation" can be achieved using only 4 watts per linear foot of actuator.

The carrier frequency applied to an actuator is dependent on the construction of the actuator. The frequency can range from 10 kHz to 65 kHz and be in the form of a sine wave, square wave, triangle wave, or sawtooth wave. The amplitude of the voltage applied to an actuator is dependent on the construction of the actuator. The voltage is typically expressed in volts peak to peak, and can range from 4 KVpp to 20 KVpp. The modulation frequency of the actuator is dependent on the flow speed and the extent of flow separation (as discussed before).

The plasma actuator is activated at an unsteady actuator frequency that is determined based in part on the velocity of the fluid flowing past the surface of the missile, aircraft, munition or automobile and in part on the placement distance of the actuator. By unsteady frequency, we mean modulation/pulsing frequency which indicates the frequency of the actuator when operating in an unsteady mode. Preferably, the plasma actuator is activated at a frequency that is proportionally based on the velocity of the fluid divided by the placement distance of the plasma actuator. Alternatively, the plasma actuator may be activated at a frequency that is based on the velocity of the fluid divided by the length of a separation bubble (or extent of flow separation). A separation bubble or the extent of flow separation can be measured or estimated. Preferably, the length of the separation bubble or extent of flow separation is measured using one or more sensors placed across the surface to determine the length or extent of flow separation across that surface. More preferably, the plasma actuator is activated at an unsteady actuator frequency that is between about 0.6 to about 4 times the velocity of the fluid divided by the placement distance of the plasma actuator from the trailing edge or aft end, or the extent of flow separation. Even more preferably, the plasma actuator is activated at an unsteady actuator frequency that is between about 0.8 to about 2 times the velocity of the fluid divided by the placement distance of the plasma actuator from the trailing edge or aft end, or the extent of flow separation. Most preferably, the plasma actuator is activated at an unsteady actuator frequency that is between about 0.95 to about 1.05 times the velocity of the fluid divided by the placement distance of the plasma actuator from the trailing edge or aft end, or the extent of flow separation.

The control of the plasma actuator in the present invention can be performed manually, using an open-loop control system, a partially closed-loop control system or a closed-loop control system. Preferably, a partially or fully closed-loop control system is used. The closed-loop control system of the present invention not only optionally receives input in part from the sensors, but also can be set up to receive input from a number of other sources. These sources can include but are not limited to the autopilot, crash avoidance, or steering systems on an aircraft; or similar systems or non-integral, non-internal command control systems used to re-program a missile in flight. The missile, aircraft, munition or automobile can be maneuvered or stabilized using this method and a flow control system based in part on the sensors input and in part (if necessary) on new input from for example the autopilot into the closed-loop control system to activate or deactivate the flow effectors as required, or in part manually.

Certain embodiments for example would connect the pressure sensor(s) (or other sensors) to a controller. The controller can be for example a proportional-integral-derivative (PID) controller, an adaptive predictive controller, or an adaptive predictive feedback controller. The controller of the present invention is preferably a closed-loop control system. The controller can be used re-establish laminar flow, to create lift or to create side forces on missile, aircraft, munition or automobile's control surface. The pressure sensor transmits a signal to the controller through the electrical connection (in practical application, multiple pressure sensors send multiple signals to the controller). The controller processes the signals to determine, through mathematical modeling, the dynamics of the flow surface. Such dynamics include but are not limited boundary layer separation and stall. It is the predictive ability of the controller, which provides for this function and expands this system from being merely responsive. This is especially advantageous for dynamic systems, which are nonlinear and time varying and operating in challenging environments. The controller produces an output signal to a monitor, recorder, alarm and/or any peripheral device for alarming, monitoring, or in some manner, affecting or precluding the dynamics upon its incipience. Advantageously, the controller is the ORICA™ controller, an extended horizon, adaptive, predictive controller, produced by Orbital Research, Inc. and patented under U.S. Pat. No. 5,424,942, which is incorporated herein by reference. Under certain conditions, the controller which is connected via electrical connection to the plasma actuator (or to a switch connected to the plasma actuator's power source) causing the actuator to activate.

Optionally a sensor is located or positioned to detect or predict flow separation or conditions of the fluid near the plasma actuator. The sensor(s) of the present invention include but are not limited to a dynamic pressure sensor, shear stress sensor (hot film anemometer, a direct measurement floating-element shear stress sensor), inertial measurement unit or system, and other sensors known to those skilled in the art whose signal could be used to estimate or determine flow condition such as separation on the surface of the missile or aircraft, which may function as a trigger point for actuating the plasma actuator. The sensors of the present invention are used to determine or estimate flow separation. An inertial measurement unit for example is a sensor, which would not directly measure forces or flow separation, but could be used to estimate or predict separation. The preferred sensor of the present invention is a pressure sensor. The pressure sensor is used to predict or sense flow separation.

The pressure sensor can be any type of sensor suitable for measuring the pressure at the flow surface. The pressure sensor can for example be a piezoelectric device, which generates an electric signal in response to a sensed pressure, a shape memory alloy device, or any other pressure sensor or transducer known to those skilled in the art. The pressure sensor can be any pressure sensor but advantageously is a microelectromechanical (MEMS) based or piezoelectric based sensor. MEMS devices are small mechanical/electrical systems that perform small-scale tasks that provide large-scale effects. MEMS devices are generally manufactured using batch microfabrication technology, the same manufacturing technology used to make integrated circuits (IC's). Consequently, many of the same benefits of IC manufacturing are applicable to MEMS manufacturing including high reliability, high yield, and low cost. Furthermore, since IC's and MEMS are both silicon-based technologies and are fabricated using similar techniques, it is relatively easy to merge microelectronics and micromechanical elements onto the same substrates. Electrostatic actuated MEMS devices have two dominating advantages as compared to other actuation mechanisms, which are high bandwidth and low power consumption.

The sensor transmits a signal, in this case a voltage but it is understood to one skilled in the art that the signal can be other than voltage, including, but not limited to, current, pressure, hydraulic or optical. The signal corresponds to the pressure it senses. Preferably, the ratio of flow effectors to sensors is less than about 100:1, more preferably less than or equal to about 50:1, still preferably less than or equal to about 20:1, even more preferably less than or equal to about 3:1, still even more preferably less than or equal to about 2:1, and most preferably less than or equal to 1:1. The higher the concentration of sensors and more preferably pressure sensors to flow effectors the more redundancy can be built into the system utilizing the present invention. Most preferably the sensor is a flush, surface mounted diaphragm type pressure sensor producing an electrical signal that can be used in a readout or sent to a controller.

Optionally, certain embodiments of the present invention include the step of estimating or determining a time of flow separation of the fluid from the surface near the location of the plasma actuator. Flow separation or surface conditions can be estimated or determined using the sensors listed above.

Referring now to FIGS. 1-7, FIG. 1. is a schematic view of an airplane 10 showing the placement or location of one or more plasma actuator(s) 12 on both the airplane's body or fuselage 11 and control surfaces 34. The airplane can be any type of aircraft, including commercial, and military. The airplane or aircraft 10 includes a fuselage 11, a tail 15, wings 16, forebody (nose) 18, afterbody 20, a rudder 22, fins 24 and boattail 26. In this specific embodiment, the plasma actuators 12 and individual sensors (not shown) are also mounted in close proximity with respect to each other on the airplane's nose 18, wings 16, rudder 22, fins 24 and boattail 26.

Figure 2:
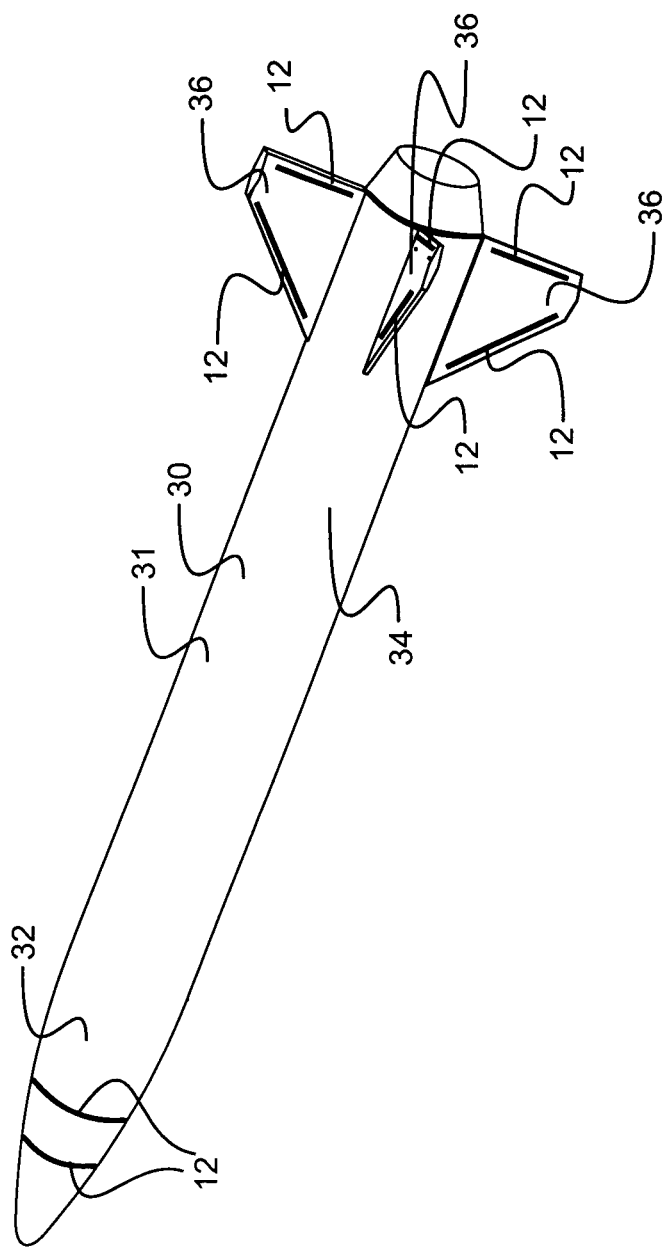
FIG. 2 is a schematic of a missile, munition or projectile with plasma actuators attached to the trailing and leading edges of its control surfaces.
Figure 2A:
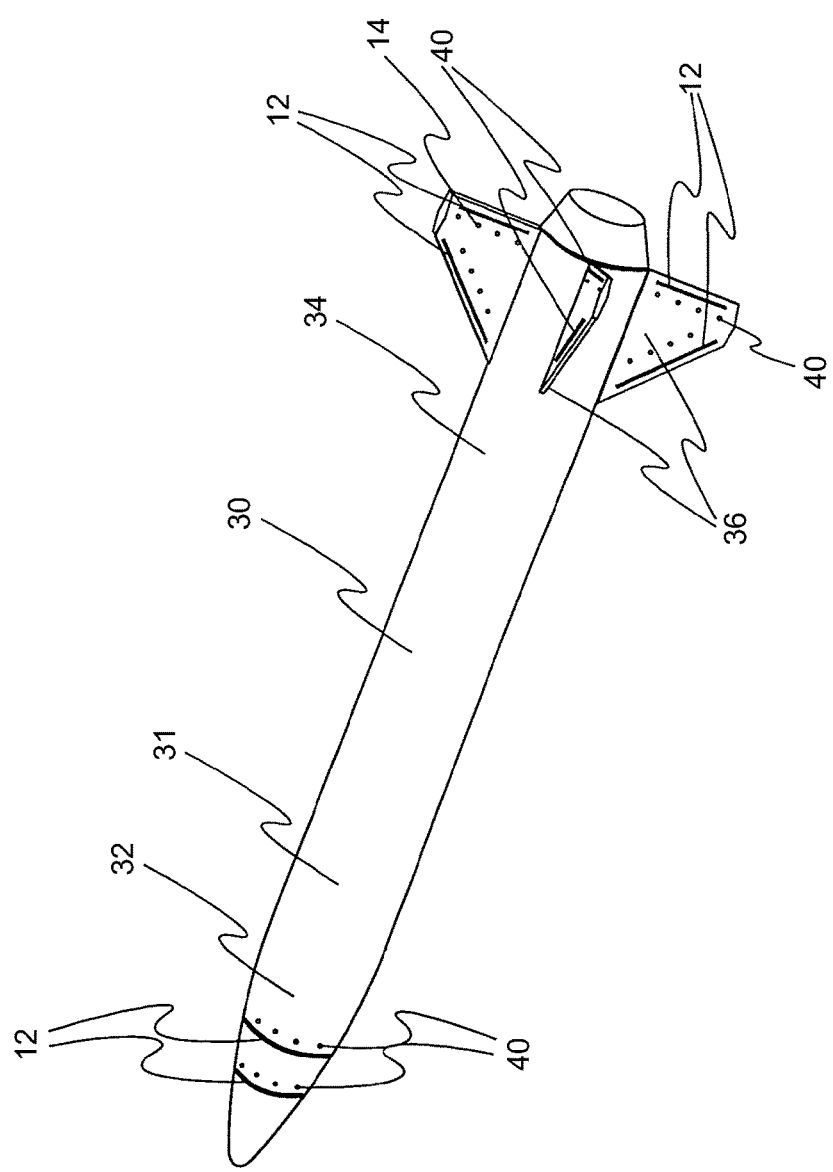
FIG. 2a is a schematic of a missile, munition or projectile with plasma actuators attached to its modified control surfaces and sensors attached to the control surface near the plasma actuators.

FIG. 2 is a schematic view of a missile, munition or projectile 30 showing the placement or location of one or more plasma actuator(s) 12 on both the missile, munition or projectile's body 31 and control surfaces or fins 36. The missile, munition or projectile 30 has a forebody 32 and afterbody 34. In this particular embodiment, plasma actuators 12 are located or placed on the missile, munition or projectile's forebody 32 and on the fins 36 located on the missile, munition or projectile's afterbody 34. Also as shown in FIG. 2a, sensors 40 may be placed or located on the missile, munition or projectile's forebody 32 and on the fins of the missile, munition or projectile's afterbody 34 and positioned to detect or predict flow separation near the location of the plasma actuator. The sensors preferably are pressure sensors having an electrical signal which is used to determine or estimate a time of flow separation of the fluid from the surface near the location of the plasma actuator.

Figure 2B:
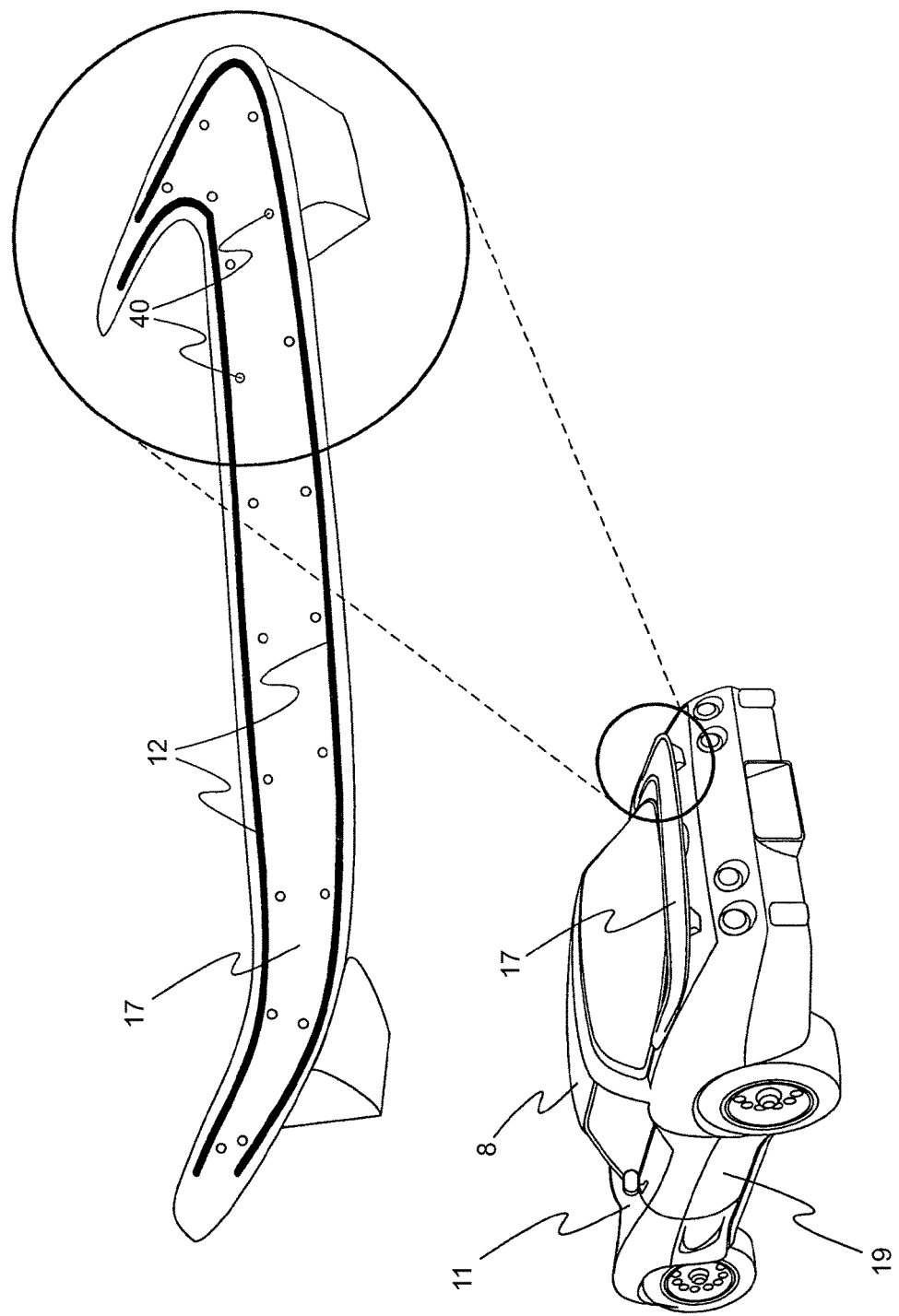
FIG. 2b is a schematic of an automobile with plasma actuators attached to its modified control surfaces and sensors attached to the control surface near the plasma actuators.

Referring now to FIG. 2*b*, there is shown a schematic view of a ground vehicle or automobile 11, having surfaces or control surfaces 19, showing the placement or location of one or more plasma actuator(s) 12. The ground vehicle or automobile's modified surface or control surface in this particular embodiment is a spoiler 17; however, the plasma actuators 12 can also be placed or located on any other surface or control surface 19 on the ground vehicle or automobile 11. Also placed or located on the spoiler 17 in FIG. 2*b* are sensors 40 positioned to detect or predict flow separation near the location of the plasma actuator 12.

Figure 3:
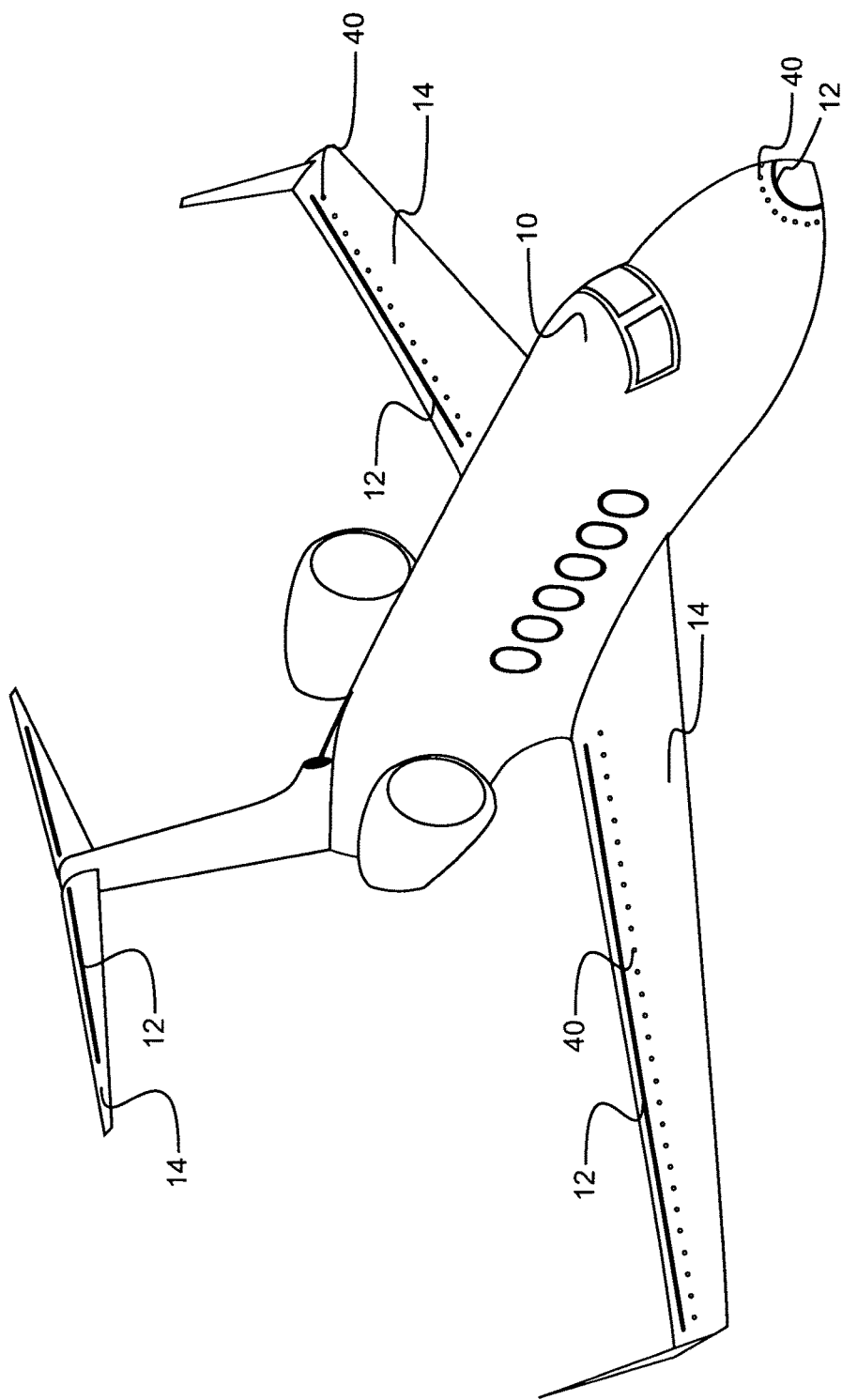
FIG. 3 is a schematic of an aircraft with plasma actuators attached to its modified control surfaces and sensors attached to the control surface near the plasma actuators.

FIG. 3 is a schematic of an aircraft with plasma actuators attached to its modified control surfaces and sensors attached to the control surface near the plasma actuators. In FIG. 3, the aircraft 10 shows the use of pressure sensors 40 in close proximity to the plasma actuators 12 to determine or estimate flow separation and attachment of the fluid on the control surfaces 14.

Figure 4:
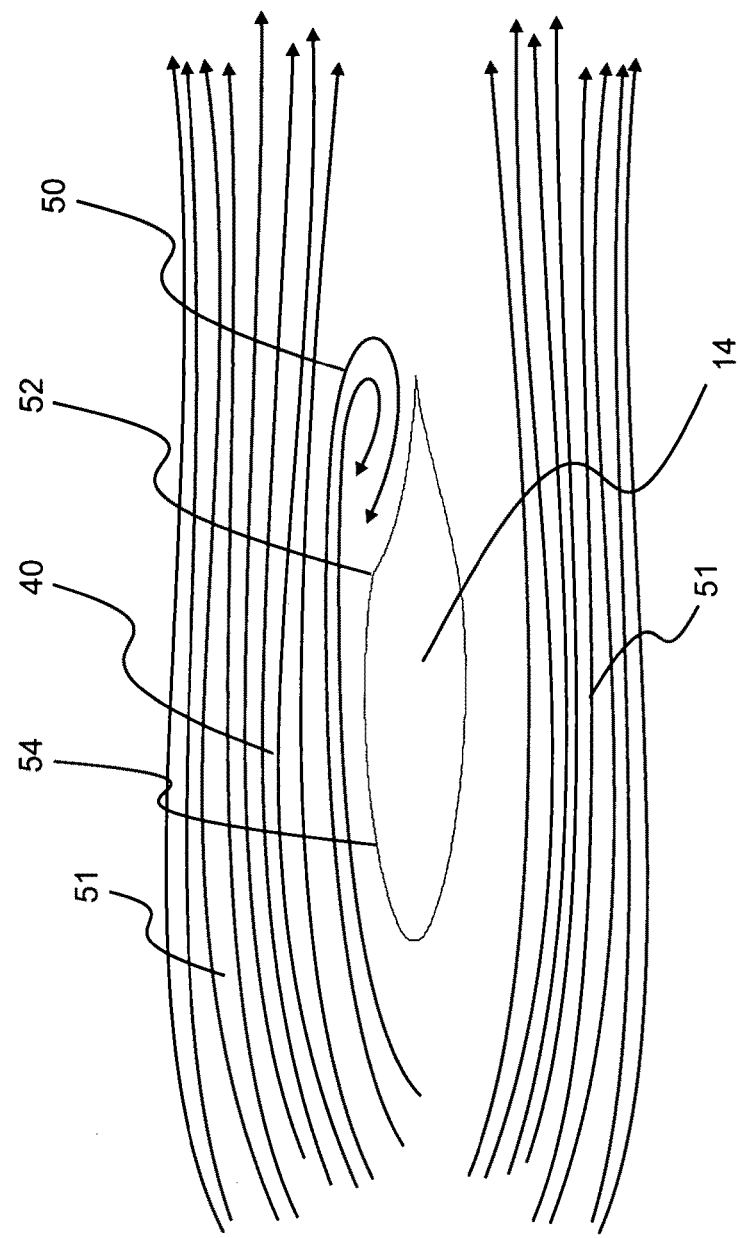
FIG. 4 is a cross-section of a wing showing air flow distribution across it and a region of flow separation beyond a surface modification (a ramp) in the upper flow surface.

FIG. 4 is a cross-section of a control surface 14 and in this particular case a wing 16 similar to the wing 16 shown in FIG. 1 showing air flow distribution 51 across it and a region of flow separation 50 beyond a surface modification (a ramp) 52 in the upper flow surface 54.

Figure 5:
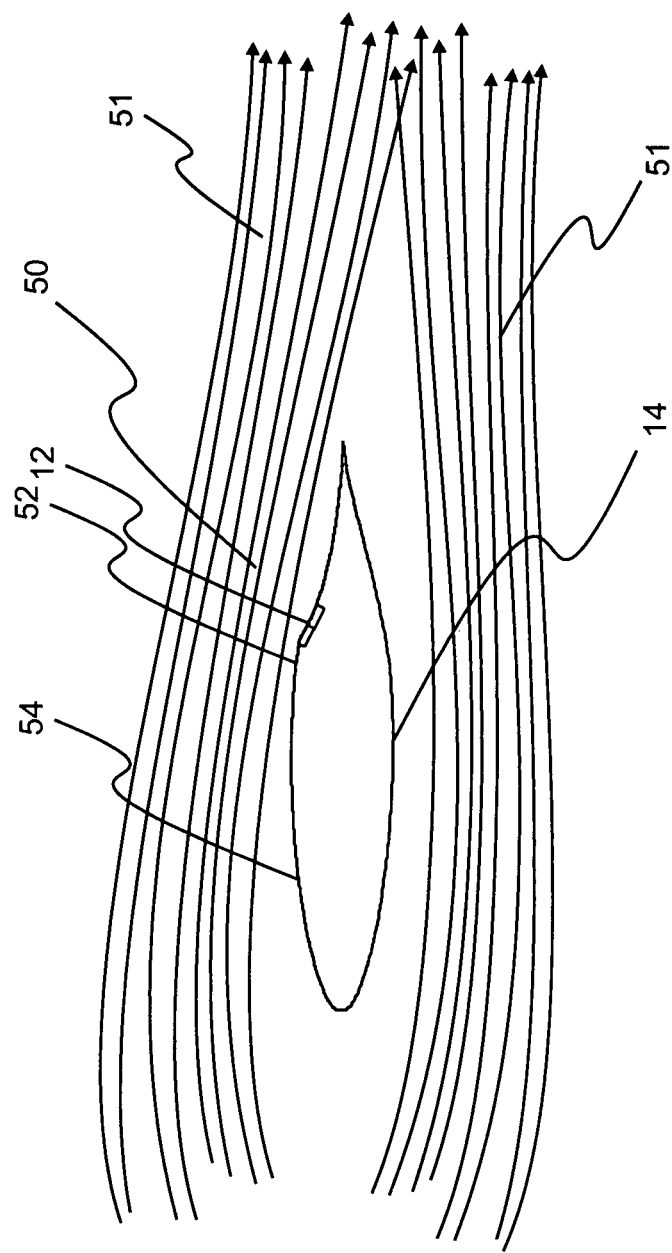
FIG. 5 is a cross-section of a wing having a surface modification and a plasma actuator attached its surface showing the effect the plasma actuator has on the airflow of a modified surface when it is activated.

FIG. 5 is a cross-section of a wing 16 similar to the wing 16 shown in FIG. 1 having a surface modification 52 and a plasma actuator 12 attached its upper surface 54 showing the effect the plasma actuator has on the airflow 51 of a modified surface when it is activated.

Figure 6:
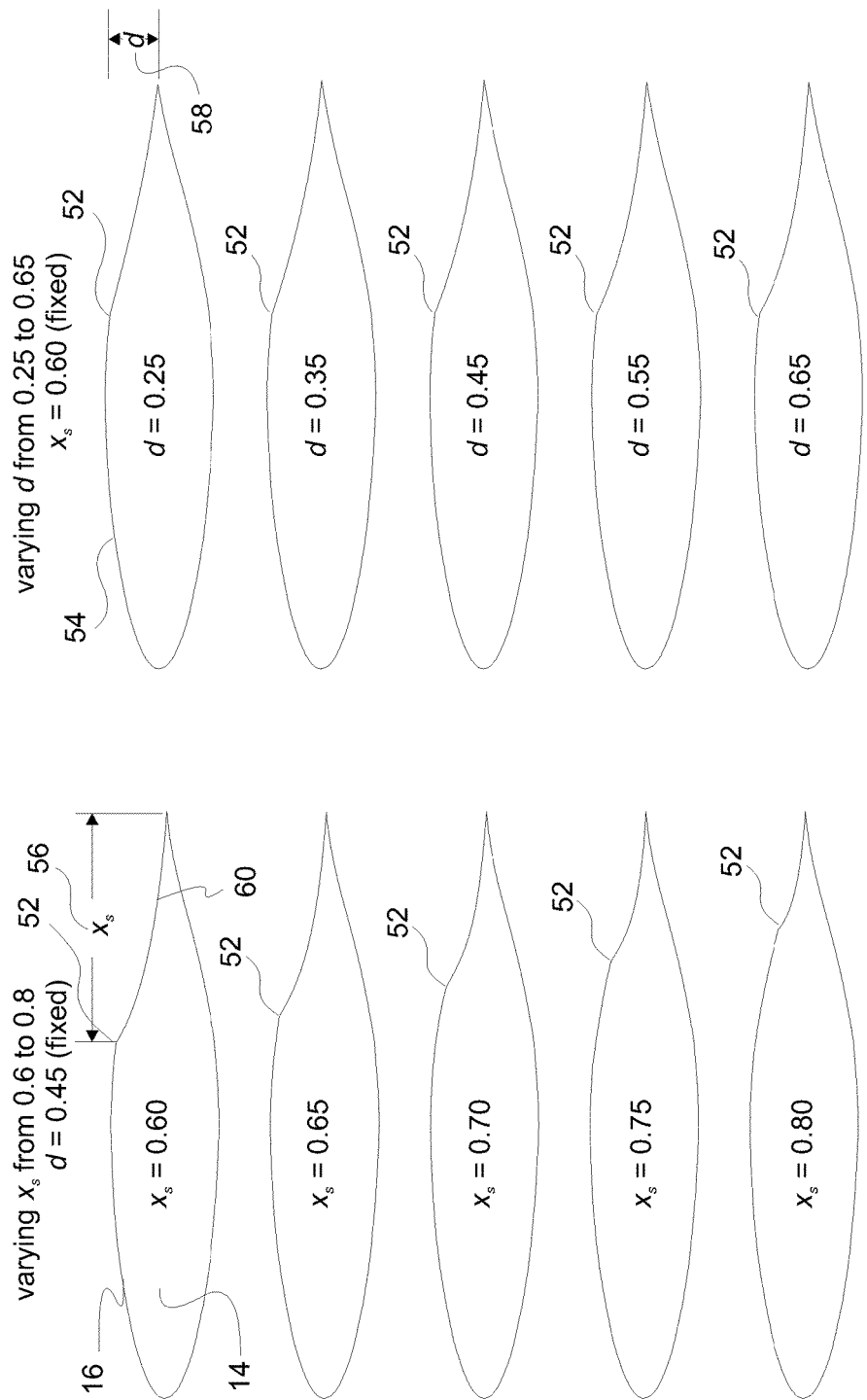
FIG. 6 is cross-sections of a wing having a surface modification where both the distance of the modification from the trailing edge as well as the depth of the surface modification or ramp are varied.

FIG. 6 are cross-sections of a wing 16 similar to the wing 16 shown in FIG. 1 having a surface modification 52 where both the distance of the modification from the trailing edge 56 as well as the depth of the upper surface 54 modification or ramp 58 are varied.

Figure 7:
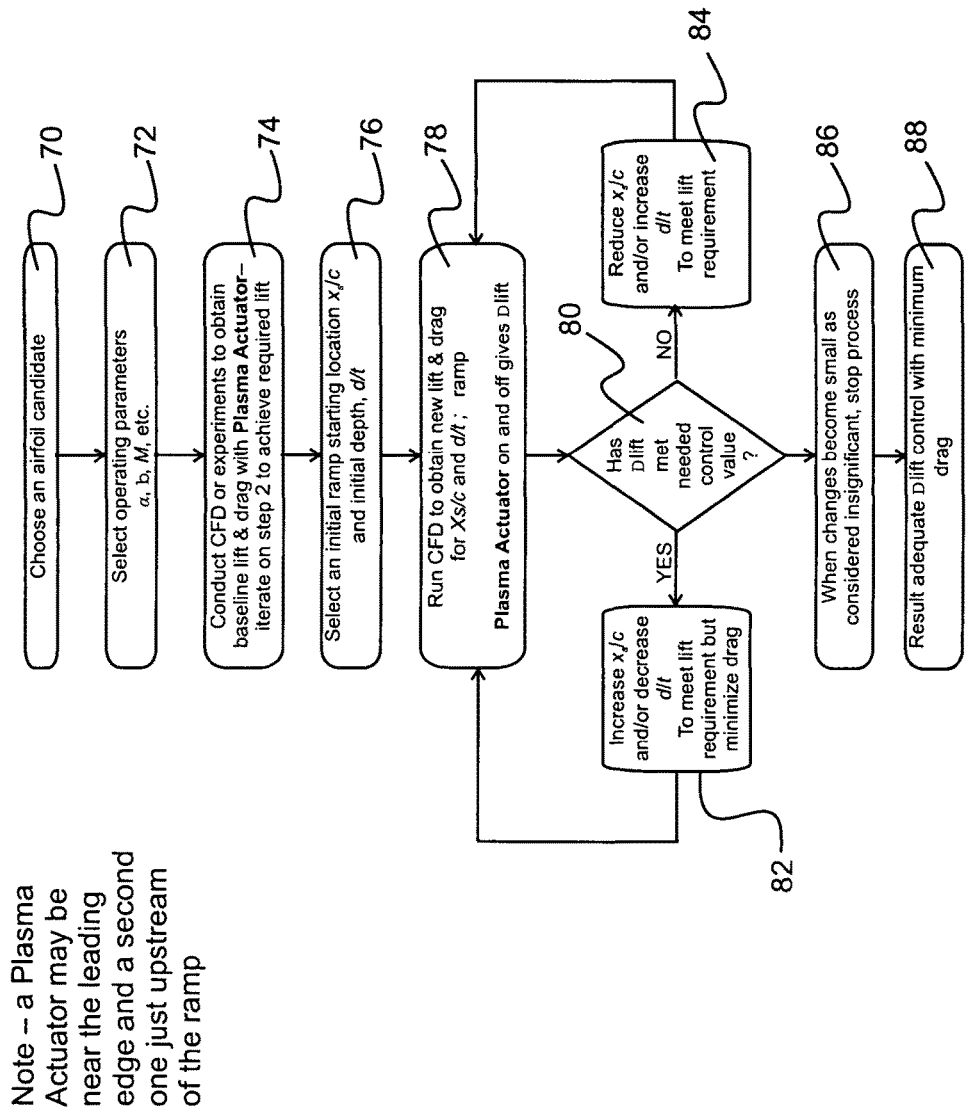
FIG. 7 is a flowchart of one embodiment for optimizing a plasma-configured airfoil of the present invention.

FIG. 7 is a flowchart of one embodiment for optimizing a plasma-configured airfoil of the present invention. In this particular embodiment, an airfoil candidate is chosen 70. This airfoil candidate or control surface may be surfaces on an aircraft, missile or automobile. Next the operating parameters of the airfoil or control surface are chosen 72. Preferably the operating parameters are such that the control surface is optimized over a broad range of operating conditions or over at least the most important operating conditions. Next, the control surface is tested preferably in a wind tunnel or by modeling under the selected operating parameters to determine baseline drag, lift and the like 74. If these baseline properties of the control system over these operating parameters are known, then this step may be skipped. The next step is to select an initial location on the control surface and depth for the modification or ramp and for placement of the plasma actuators 76. Preferably, the location is selected based all information known at the time including previous experience with similar types of control surfaces. The control surface is then tested in a wind tunnel or modeled with CFD to obtain determine the effect on its performance 78, and the effect of using the plasma actuator with the modified control surface under the given operating parameters. If the areas of performance sought to be improved exceeds that baseline property then the initial starting location is increased and/or the initial depth is decreased 82, and the control surface is tested again 78. If the areas of performance sought to be improved does not exceed the baseline property then the initial starting location is reduced and/or the initial depth is decreased 84, and the control surface is tested again 78. This is continually repeated until the improvement of the control surface becomes minimal 86. One preferred property is to meet the lift requirements of the control surface while reducing drag. These improvements can result in an aircraft, missile or automobile with much improved efficiencies.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. An aircraft, missile, projectile, munition, or automobile comprising
    at least one surface over which air flow occurs, the at least one surface having a leading edge and a trailing edge, the at least one surface comprising a modified contour, the modified contour being designed to create a surface flow disturbance along the surface beyond a specific location on the surface, and
    at least one plasma actuator being positioned on the surface to affect the created surface flow disturbance along the surface when actuated,
    wherein the at least one plasma actuator when actuated modifies the air flow over the at least one surface.

2. The aircraft, missile, projectile, munition, or automobile in claim 1, wherein the surface is a control surface.

3. The aircraft, missile, projectile, munition, or automobile in claim 2, wherein the modified contour is a ramp.

4. The aircraft, missile, projectile, munition, or automobile in claim 3, wherein the plasma actuator in combination with the ramp modifies at least one aerodynamic condition of the surface.

5. The aircraft, missile, projectile, munition, or automobile in claim 1, wherein the plasma actuator operates in an unsteady state.

6. The aircraft, missile, projectile, munition, or automobile in claim 5, wherein the plasma actuator is activated at a frequency equal to between about 0.6 to about 4 times the velocity of the fluid flowing over the surface divided by a characteristic placement distance measured from the actuator to the trailing edge, or the extent of flow separation.

7. An aircraft, missile, projectile, munition, or automobile comprising
    at least one surface over which air flow occurs, the at least one surface having a leading edge and a trailing edge, the at least one surface comprising a modified contour, the modified contour comprising a ramp designed to induce boundary layer separation in flow over the surface beyond a specific location on the surface, and
    at least one plasma actuator positioned on the surface to affect the created surface flow disturbance along the surface when actuated,
    wherein the at least one plasma actuator when actuated modifies the air flow over the at least one surface.

8. The aircraft, missile, projectile, munition, or automobile in claim 7, wherein the surface is a control surface.

9. The aircraft, missile, projectile, munition, or automobile in claim 8, wherein the ramp is a Stratford ramp that induces continuous boundary layer separation and a flow detachment point at a specific location on the control surface.

10. The aircraft, missile, projectile, munition, or automobile in claim 9, wherein the plasma actuator in combination with the ramp modifies at least one aerodynamic condition of the surface.

11. The aircraft, missile, projectile, munition, or automobile in claim 10, wherein the dimensions of the ramp are optimized to maximally increase the plasma actuator's improvement of performance in any two of reducing drag of the surface, increasing lift of the surface, and reducing power requirements of the aircraft, missile, projectile, munition, or automobile under at least one operating condition.

12. The aircraft, missile, projectile, munition, or automobile in claim 7, wherein the plasma actuator operates in an unsteady state.

13. The aircraft, missile, projectile, munition, or automobile in claim 12, wherein the plasma actuator is activated at a frequency equal to between about 0.6 to about 4 times the velocity of the fluid flowing over the surface divided by a characteristic placement distance measured from the actuator to the trailing edge, or the extent of flow separation.

14. An aircraft, missile, projectile, munition, or automobile comprising
at least one surface over which air flow occurs, the at least one surface having a leading edge and a trailing edge, the at least one surface comprising a modified contour, the modified contour comprising a Stratford ramp designed to induce continuous boundary layer separation in flow over the surface and a flow detachment point at a specific location on the control surface,
at least one actuator positioned on the surface to affect the created surface flow disturbance along the surface when actuated, and
at least one sensor positioned on the surface to measure the flow over the surface near the at least one actuator or to detect or predict flow separation or conditions of the air flow near the at least one actuator
wherein the at least one actuator when actuated modifies the air flow over the at least one surface.

15. The aircraft, missile, projectile, munition, or automobile in claim 14, wherein the surface is a control surface.

16. The aircraft, missile, projectile, munition, or automobile in claim 14, wherein the sensor is a MEMS air pressure sensor.

17. The aircraft, missile, projectile, munition, or automobile in claim 14, wherein the actuator in combination with the Stratford ramp modifies at least one aerodynamic condition of the surface, and wherein the dimensions of the Stratford ramp are optimized to maximally increase the actuator's improvement of performance in any two of reducing drag of the surface, increasing lift of the surface, and reducing power requirements of the aircraft, missile, projectile, munition, or automobile under at least one operating condition.

18. The aircraft, missile, projectile, munition, or automobile in claim 14, wherein an adaptive predictive closed-loop control system controls the actuation of the at least one actuator based at least in part on a signal from the at least one sensor.

19. The aircraft, missile, projectile, munition, or automobile in claim 14, wherein the actuator operates in an unsteady state.

20. The aircraft, missile, projectile, munition, or automobile in claim 19, wherein the actuator is activated at a frequency equal to between about 0.6 to about 4 times the velocity of the fluid flowing over the surface divided by a characteristic placement distance measured from the actuator to the trailing edge, or the extent of flow separation.

* * * * *